June 23, 1970  Y. MACHEFERT-TASSIN  3,516,364
RESILIENT SUPPORTING DEVICE FOR A RAILWAY LINEAR MOTOR
Filed Nov. 18, 1968  2 Sheets-Sheet 1
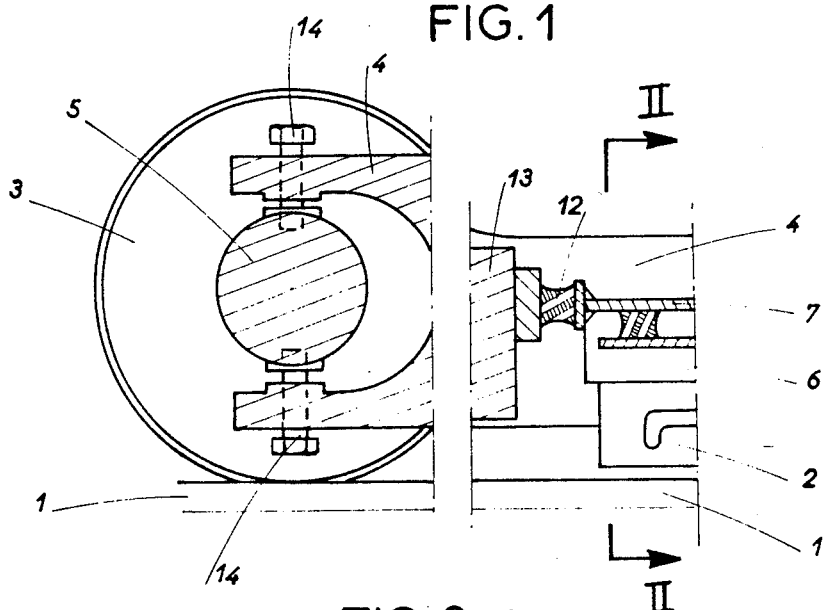
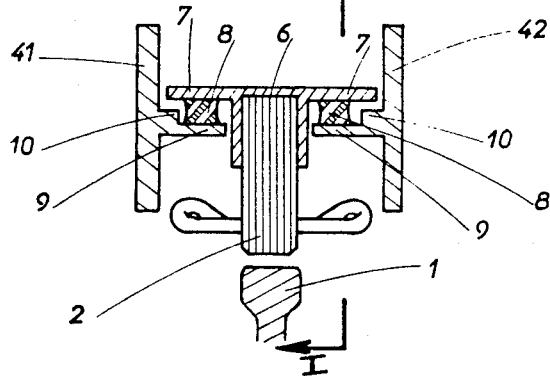
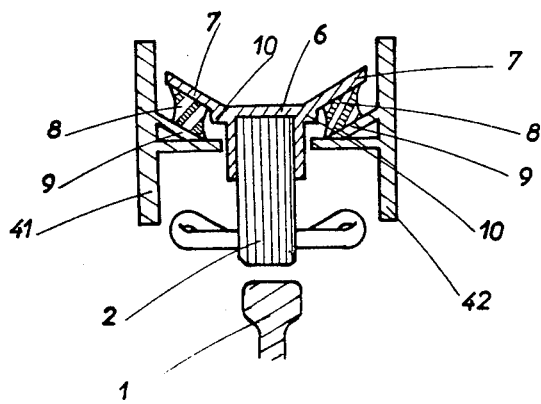

United States Patent Office 3,516,364
Patented June 23, 1970

3,516,364
RESILIENT SUPPORTING DEVICE FOR A
RAILWAY LINEAR MOTOR
Yves Machefert-Tassin, Saint-Cloud, France, assignor to
Societe MTE, Paris, France, a company of France
Filed Nov. 18, 1968, Ser. No. 776,699
Claims priority, application France, Dec. 28, 1967,
134,146
Int. Cl. B61c 11/00, 15/00
U.S. Cl. 105—49                                9 Claims

ABSTRACT OF THE DISCLOSURE

This invention relates to en elastomeric means for attaching to a rail vehicle a linear motor comprising a series of inductors for each rail, carried by a supporting member which is itself resiliently carried by a longitudinal member resting on the vehicle axles.

---

The invention relates to a device for attaching a linear motor on a railway vehicle.

The device can be applied more particularly to linear motors comprising an inductor disposed between the wheels of the vehicle and acting on the traffic rails, which each form a solid linear armature.

Motors of this type have the advantage of using ordinary railway lines. Since the lines are made of steel, the inductors are strongly attracted to the rails. For this reason, the inductors are disposed on a longitudinal member resting at each end on the vehicle axles. As a result, the air gap is kept constant by the wheels of the vehicle.

The inductors, however, have to be held on the longitudinal member by a flexible suspension means, owing to possible irregularities in the track and in order to avoid vibrations and to adjust the gap if necessary.

The invention, accordingly, relates to a means for attachment of a linear motor on a railway vehicle, in which the linear motor comprises a series of inductors for each rail, disposed longitudinally with respect to the rail and held above the rail by a longitudinal member resting on the vehicle wheel axles, the device comprising, for each series of inductors, a supporting member on which the inductors are fixed and which, on each side of the inductors, has a longitudinal flange connected to supports fixed to the longitudinal member by resilient means which oppose the attraction between the inductors and the rail.

The invention will now be described with reference to an exemplary embodiment shown in the drawings, in which:

FIG. 1 is a partial view of the device according to the invention and of the method of attaching the longitudinal member to a wheel axle in a section along line I—I in FIG. 2;

FIG. 2 is a partial view of the attachment means, in section along line II—II in FIG. 1;

FIG. 3 is a variant embodiment in section along the line III—III of FIG. 1;

Figure 4:
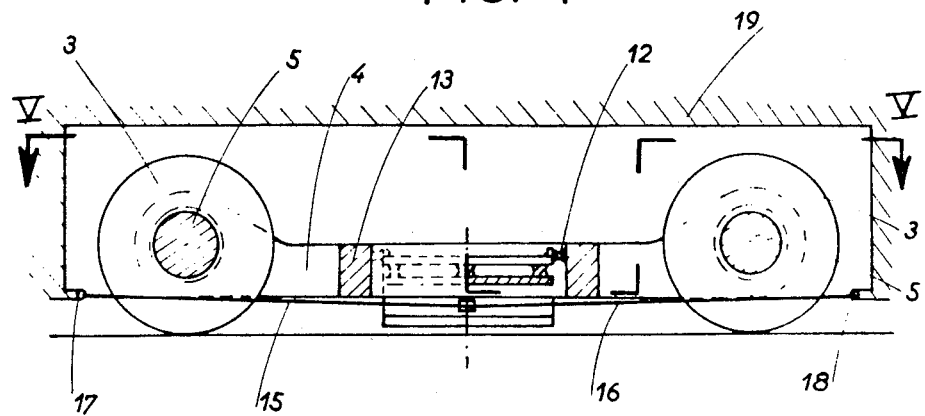
FIG. 4 is a diagrammatic view of a bogey equipped with a linear motor comprising one variant of the device, in section along line IV—IV in FIG. 5.

For each rail 1, the device comprises a series of inductors 2 disposed between the wheels 3 of a bogey on a longitudinal member 4 whose ends rest on the axle boxes and the axles 5 of wheels 3.

Each longitudinal member comprises two longitudinal webs 41, 42 between which the series of inductors 2 is disposed.

The linear motor, in known manner, comprises a series of windings disposed in a lamination stack parallel to the tread of the rail. The windings are placed one behind the other and cooperate with the lamination stacks to form the inductor windings 2 of a motor which has rail 1 for its solid linear armature.

The inductors 2 are fixed on a support 6 formed with two longitudinal flanges 7 extending one on each side of the inductors.

Flanges 7 are connected by resilient studs 8 to supports 9 disposed on webs 41 and 42 of the longitudinal member.

In the embodiment shown in FIG. 2, the longitudinal flanges 7 and supports 9 are parallel to the tread of rail 1.

In the embodiment in FIG. 3, flanges 7 and supports 9 on each side of the inductors are symmetrically inclined with respect to the plane of symmetry of the inductor.

This method of suspension enables the angular position of the motor to be varied slightly with respect to the vertical.

In the two embodiments, the crushing stress on resilient studs 8 is limited by abutments 10 on which flanges 7 can rest and which thus determine the minimum height of the air gaps between the inductors and the tread of rail 1.

The reason is that when the motor is energised, it undergoes a force of attraction in the air gap which tends to pull the inductors near the tread.

When the field is saturated, the attraction toward the rail does not vary greatly and the vertical crushing stress on the resilient studs 8 can be adjusted so that abutments 10 act merely as safety devices limiting the minimum air gap. The result is a residual filtering, at least in the highest frequency band, of the shocks transmitted by the rail or due to the movement of the motor itself.

Abutments 10 can have adjusting nuts or a locking system so that the final limiting air gap can be kept constant with fair accuracy. The initial adjustment, however, which depends on the wear on guiding wheels 3 and on the preservation of the motor air gap, may be too large to be absorbed by abutments 10. Accordingly, the initial adjustment can be performed by means 14 for attaching the longitudinal members 4 on axles 5, comprising e.g. screws for adjusting the position of the longitudinal member with respect to the nut.

The resilient studs 8 also provide a damped transverse suspension with a clearance limited by the lateral abutment of flanges 7 against webs 41 and 42.

Transverse studs 11 (FIG. 5) can also be used to maintain the transverse position of the inductors with respect to webs 41 and 42.

In the embodiment shown in FIG. 1, the longitudinal driving force produced by the field sliding over the inductors is transmitted to the bogey by resilient longitudinal studs 12 connecting support member 6 to the bogey cross-members 13. The resilience of studs 12 damps and transmits the braking and driving forces from the inductors to the bogey.

Figure 5:
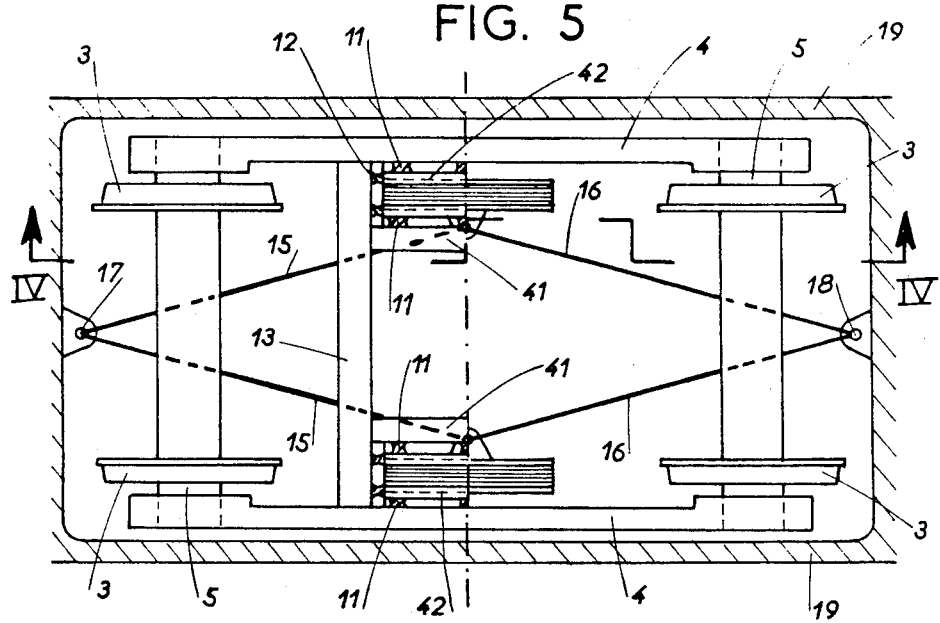
FIG. 5 is a plan view of the device shown in FIG. 4, in section along the line V—V in FIG. 4.

In a second embodiment shown in FIGS. 4 and 5, the supports 6 of two series of symmetrical inductors are each connected by two rods 15 and 16 respectively to swivel joints 17 and 18 disposed in front of and behind a bogey on the vehicle frame 19, in the plane of symmetry of the latter.

As a result, driving and braking forces are transmitted directly to the vehicle frame. As a result, if there is a slight lack of balance between the forces to be transmitted by each motor individually, the bogey does not rock and sway as a result. This direct connection also enables the motors to be completely independent of the bogey, inter alia for transverse movement, and thus is equivalent to complete suspension of the motor.

In order to ensure the necessary flexibility between the motors and the frame, the rods can have a resilient intermediate member for damping the transmitted forces. The rod attachments on the frame and the inductors are disposed substantially in the same horizontal plane. This "low traction" arrangement limits the extent to which the body can jump.

Longitudinal studs 12, shown in FIG. 1, are not necessary for the transmission of longitudinal forces. They should, however, also be included in the embodiment with rod transmission, since they can be used to damp variations in the driving force of the inductors due e.g. to irregularities in the track resulting in variations in the air gaps.

The device which has been described is not only suitable for the resilient suspension of inductors, but can also be applied to driving on tracks at an irregular level, such as sidings or shunting lines. The reason for this is that when the speed is reduced in order to travel on a siding, the voltage decreases and the inductors are subjected to less attraction and are lifted by the resilient studs. As a result, the air gap is lengthened and the train can safely travel at a reduced speed, without risk of any abrupt change in the tread line, more particularly when a joint is passed over.

The invention, of course, is not restricted to the details of the two embodiments described, since these can be modified without exceeding the scope of the invention.

The member supporting the inductors could, for example, be hooked on to support 9 by resilient means instead of bearing against it. In this case, the studs will be tensioned and not compressed by the attractive forces between the inductors and the rail. The studs can be made of any resilient material and could, of course, be replaced by springs.

Rods 15 and 16 for transmitting longitudinal forces could, of course, be replaced by any connecting means that can serve the same purpose, such as chains or cables.

In short, use can be made of any other means for transmitting the driving and braking forces to the vehicle frame.

What I claim is:

1. An attachment for a linear motor to a rail vehicle, the linear motor having a series of inductors for each rail disposed longitudinally with respect to the rail and held above the rail by a longitudinal member resting on the vehicle wheel axles comprising, for each series of inductors, a supporting member on which the inductors are mounted, a longitudinal flange on said member, supports connected to said flange, resilient means connecting said supports to the longitudinal member, said resilient means opposing the attraction between the inductors and abutments integral with the longitudinal member limiting the movement of the inductors toward the rail and engageable with said longitudinal flange.

2. An attachment according to claim 1, the longitudinal flanges and the supports of the resilient members on the longitudinal member being perpendicular to the longitudinal plane of symmetry of the inductors.

3. An attachment according to claim 1, the longitudinal flanges and the supports on the longitudinal member being symmetrically inclined with respect to the longitudinal plane of symmetry of the inductor.

4. An attachment according to claim 1, the front and/or rear surfaces of the inductor support being connected by longitudinal resilient members to transverse abutments fixed to the longitudinal member.

5. An attachment according to claim 1, the series of inductors for each rail being symmetrically mounted on the longitudinal members of at least one bogey of the vehicle.

6. An attachment according to claim 5, the supports of the two series of symmetrical inductors in a bogey being connected by means for transmitting longitudinal forces to joints disposed on the vehicle frame in its longitudinal plane of symmetry.

7. An attachment according to claim 6, the means for transmitting longitudinal forces being cables.

8. An attachment according to claim 6, the means for transmitting longitudinal forces being rods.

9. An attachment according to claim 6, the means for transmitting longitudinal forces being resilient rods.

References Cited

UNITED STATES PATENTS

| | | | |
|---|---|---|---|
| 269,092 | 12/1882 | Molera | 105—78 XR |
| 283,759 | 8/1883 | Daft | 105—77 XR |
| 467,243 | 1/1892 | Walter | 105—77 XR |
| 1,898,555 | 2/1933 | McCune | 105—77 |
| 2,124,125 | 7/1938 | Schoepf et al. | 105—77 XR |
| 2,967,915 | 1/1961 | Dean | 191—49 |
| 3,356,041 | 12/1967 | Bliss | 104—148 |

ARTHUR L. LA POINT, Primary Examiner

H. BELTRAN, Assistant Examiner

U.S. Cl. X.R.

104—148; 105—76, 77; 191—49; 310—13